May 26, 1925.
C. C. FARMER
BRAKE PIPE VENT VALVE
Filed June 24, 1924
1,538,933
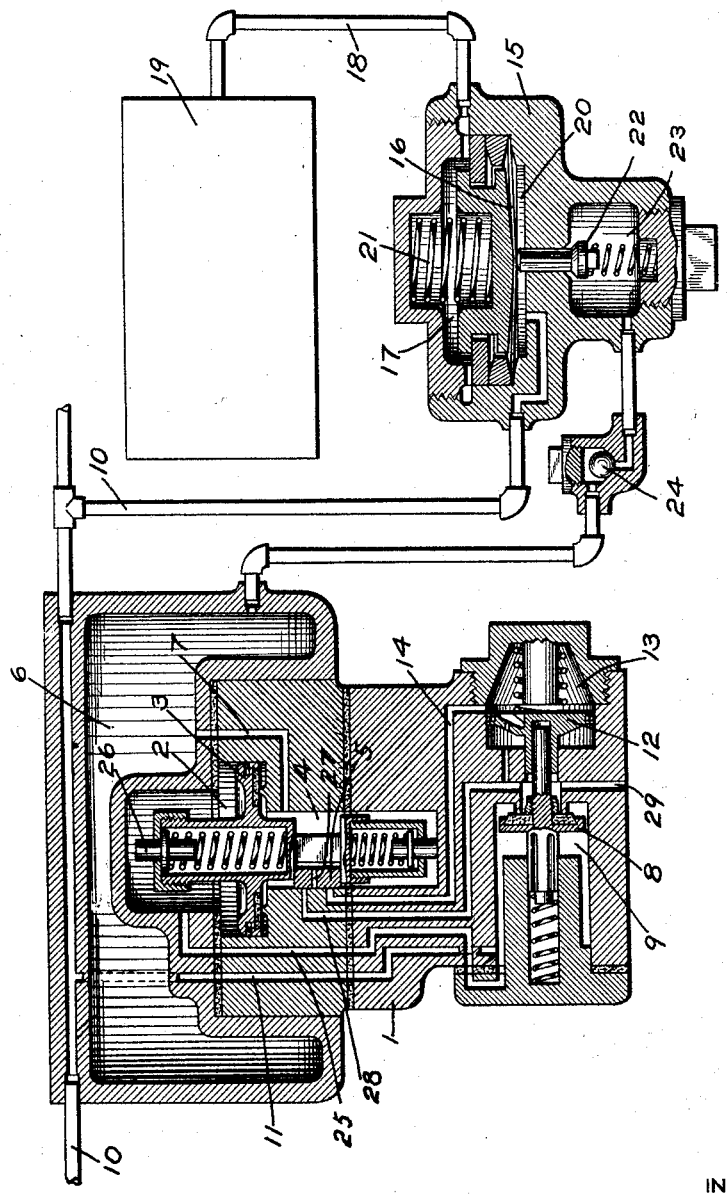
INVENTOR
CLYDE C. FARMER
BY *Wm. M. Cady*
ATTORNEY Patented May 26, 1925.

1,538,933

UNITED STATES PATENT OFFICE.

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

BRAKE-PIPE VENT VALVE.

Application filed June 24, 1924. Serial No. 722,016.

*To all whom it may concern:*

Be it known that I, CLYDE C. FARMER, a citizen of the United States, residing at Pittsburgh, in the county of Allegheny and State of Pennsylvania, have invented new and useful Improvements in Brake-Pipe Vent Valves, of which the following is a specification.

This invention relates to fluid pressure brakes, and more particularly to a vent valve device for venting fluid under pressure from the brake pipe upon a sudden reduction in brake pipe pressure.

It has heretofore been proposed to provide a quick action vent valve device having a piston subject to the opposing pressures of the brake pipe and a chamber which is charged from the brake pipe, and a valve operated by said piston upon a sudden reduction in brake pipe pressure for effecting a local venting of fluid from the brake pipe.

The chamber above referred to, being charged from the brake pipe, is liable to be overcharged at times, due to the movement of the brake valve to full release position, when the brake pipe pressure at the head end of the train may be temporarily in excess of the normal pressure carried in the brake pipe. If the chamber is overcharged, then upon the brake pipe pressure settling down to the normal pressure when the brake valve is moved to running position, the higher differential pressure thus set up in the quick action chamber may act to effect the movement of the vent valve piston to emergency position and thus cause an emergency application of the brakes when not intended.

The principal object of my invention is to provide a vent valve device having means for overcoming the above difficulty.

In the accompanying drawing, the single figure is a sectional view of a brake pipe vent valve device with my improvement applied thereto.

The brake pipe vent valve device may comprise a casing 1 having a piston chamber 2 containing a piston 3 and a valve chamber 4 containing a slide valve 5 adapted to be operated by piston 3. The volume of valve chamber 4 is increased by the quick action chamber 6 which is connected by passage 7 to the valve chamber 4.

A valve 8 contained in valve chamber 9 controls the venting of fluid from the brake pipe 10 which is connected by passage 11 to said chamber and valve 8 is adapted to be operated by piston 12, contained in piston chamber 13, said piston chamber having a passage 14 leading to the seat of slide valve 5.

According to my invention, the charging of the quick action chamber 6 and valve chamber 4 from the brake pipe 10 is controlled by a valve device comprising a casing 15 containing a flexible diaphragm 16, having the chamber 17 at one side of the diaphragm connected by pipe 18 to the usual auxiliary reservoir 19 of the fluid pressure brake equipment. The chamber 20 at the opposite side of the diaphragm is connected to the brake pipe 10 and said diaphragm is also subject to the pressure of a coil spring 21 acting on the diaphragm at the auxiliary reservoir pressure side thereof. Communication from chamber 20 and the brake pipe 10 to the quick action chamber 6 is controlled by a valve 22 which is adapted to be operated by the movement of diaphragm 16.

In operation, when the brake pipe 10 is charged with fluid under pressure, fluid flows from the brake pipe to charge the auxiliary reservoir on each car by way of the usual feed groove around the triple valve piston. Fluid under pressure also flows from the brake pipe to the chamber 20. When the auxiliary reservoir has been charged to substantially the equalization point, the spring 21 will act on the diaphragm 16 to open the valve 22 and permit flow of fluid from the brake pipe to valve chamber 23 and thence past the check valve 24 to quick action chamber 6.

The valve chamber 4 is charged with the quick action chamber 6 through passage 7 and since piston chamber 2 is connected to the brake pipe 10 through passages 11 and 25, the pressures on opposite sides of piston 3 equalize and the piston 3 is held in its normal position, as shown in the drawing. If a gradual service reduction in brake pipe pressure is made, the piston 3 will be moved out until the spring stop 26 engages the casing cap and in this position, a port 27 through the valve 5, registers with a passage 28 which is open to an atmospheric exhaust port 29. Fluid under pressure is then vented from valve chamber 4 and quick action chamber 6, so that further movement of piston 3 to emergency position is prevented, and the pressure in the quick action chamber is reduced as the brake pipe pressure reduces.

If a sudden reduction in brake pipe pressure occurs, the piston 3 will be moved to emergency position, in which passage 14 is uncovered, so that fluid from the valve chamber 4 and quick action chamber 6 is vented to the piston chamber 13. Piston 12 is then shifted outwardly, so as to open the valve 8 and thereby vent fluid from the brake pipe 10 by way of passage 11, valve chamber 9, and exhaust port 29, to effect a local reduction in brake pipe pressure.

When the brake valve is turned to full release position, to effect the release of the brakes, if the brake pipe pressure should rise at a greater rate than the auxiliary reservoir is being recharged, as may occur at the head end of the train, the higher brake pipe pressure in chamber 20 will operate the diaphragm 16, so as to permit the valve 22 to close and thus prevent the charging of the quick action chamber 6. When the brake valve is moved to running position, and the brake pipe pressure settles down and becomes substantially equal to the auxiliary reservoir pressure, the spring 21 will operate the diaphragm 16 to open the valve 22 and permit the quick action chamber to be charged from the brake pipe.

It will now be seen that the above described construction prevents the overcharging of the quick action chamber from the brake pipe and thus prevents possible unintended movement of the vent valve piston 3 to emergency position by excess pressure in the quick action chamber.

Having now described my invention, what I claim as new and desire to secure by Letters Patent, is:—

1. In a fluid pressure brake, the combination with a brake pipe and an auxiliary reservoir, of a valve device subject to the opposing pressures of the brake pipe and a chamber for controlling the venting of fluid from the brake pipe, and means subject to the opposing pressures of the brake pipe and the auxiliary reservoir for controlling the charging of said chamber with fluid under pressure.

2. In a fluid pressure brake, the combination with a brake pipe and an auxiliary reservoir, of a valve device subject to the opposing pressures of the brake pipe and a chamber for controlling the venting of fluid from the brake pipe, and means subject to the opposing pressures of the brake pipe and the auxiliary reservoir for controlling the charging of said chamber with fluid under pressure from the brake pipe.

3. In a fluid pressure brake, the combination with a brake pipe and an auxiliary reservoir, of a valve device having a movable abutment subject to the opposing pressures of the brake pipe and a chamber, valve means operated by said abutment upon a sudden reduction in brake pipe pressure for venting fluid from the brake pipe, a valve for controlling communication from the brake pipe to said chamber, and a movable abutment subject to the opposing pressures of the brake pipe and the auxiliary reservoir for operating said valve.

4. The combination with a brake pipe, auxiliary reservoir, and a valve device subject to the opposing pressures of the brake pipe and a chamber and operated upon a sudden reduction in brake pipe pressure for venting fluid from the brake pipe, of a valve for controlling the charging of said chamber from the brake pipe and a movable abutment subject on one side to brake pipe pressure and on the other side to the pressure of a spring and auxiliary reservoir pressure for operating said valve.

5. The combination with a brake pipe, auxiliary reservoir, and a valve device subject to the opposing pressures of the brake pipe and a chamber and operated upon a sudden reduction in brake pipe pressure for venting fluid from the brake pipe, of means for controlling communication through which said chamber is charged with fluid under pressure from the brake pipe and operated upon a rapid increase in brake pipe pressure for closing said communication.

6. The combination with a brake pipe, auxiliary reservoir, and a valve device subject to the opposing pressures of the brake pipe and a chamber and operated upon a sudden reduction in brake pipe pressure for venting fluid from the brake pipe, of means for controlling communication through which said chamber is charged with fluid under pressure from the brake pipe and operated upon an increase in brake pipe pressure above the pressure in the auxiliary reservoir for closing said communication.

In testimony whereof I have hereunto set my hand.

CLYDE C. FARMER.